(12) United States Patent
Kari

(10) Patent No.: US 9,419,495 B2
(45) Date of Patent: Aug. 16, 2016

(54) WIND TURBINE

(71) Applicant: Miba Gleitlager GmbH, Laakirchen (AT)

(72) Inventor: Alexander Kari, Fuschl am See (AT)

(73) Assignee: Miba Gleitlager GmbH, Laakirchen (AT)

(*) Notice: Subject to any disclaimer, the term of this patent is extended or adjusted under 35 U.S.C. 154(b) by 0 days.

(21) Appl. No.: 14/371,573

(22) PCT Filed: Jan. 15, 2013

(86) PCT No.: PCT/AT2013/050011
§ 371 (c)(1),
(2) Date: Jul. 10, 2014

(87) PCT Pub. No.: WO2013/106878
PCT Pub. Date: Jul. 25, 2013

(65) Prior Publication Data
US 2014/0378261 A1 Dec. 25, 2014

(30) Foreign Application Priority Data

Jan. 16, 2012 (AT) .................................. 38/2012

(51) Int. Cl.
*F16H 1/28* (2006.01)
*H02K 7/116* (2006.01)
(Continued)

(52) U.S. Cl.
CPC ............... *H02K 7/116* (2013.01); *F03D 11/02* (2013.01); *F16H 1/28* (2013.01); *F05B 2260/40311* (2013.01); *F05B 2260/79* (2013.01); *F16H 57/082* (2013.01); *F16H 2057/085* (2013.01); *Y02E 10/722* (2013.01)

(58) Field of Classification Search
CPC .................. F16H 2057/082; F16H 2057/085; F16H 1/2836; Y02E 10/722
USPC ................... 475/331, 346, 347, 348
See application file for complete search history.

(56) References Cited

U.S. PATENT DOCUMENTS

| 1,820,061 | A | * | 8/1931 | Flagg | ........................ | F16H 1/28 |
| | | | | | | 475/331 |
| 4,030,377 | A | * | 6/1977 | Keske | ..................... | F16H 48/10 |
| | | | | | | 475/226 |
| 4,747,324 | A | * | 5/1988 | Perry | ...................... | F16H 13/02 |
| | | | | | | 475/343 |

(Continued)

FOREIGN PATENT DOCUMENTS

| AT | 509 624 A1 | 10/2011 |
| CN | 202074011 U | 12/2011 |

(Continued)

OTHER PUBLICATIONS

International Search Report of PCT/AT2013/050011, mailed Apr. 17, 2013.

*Primary Examiner* — Roger Pang
(74) *Attorney, Agent, or Firm* — Collard & Roe, P.C.

(57) ABSTRACT

A wind turbine has a rotor and a generator. A planetary transmission is arranged between the rotor and the generator, the planetary transmission being operatively connected to the rotor and the generator. The planetary transmission has at least one planet gear, at least one planet pin, and a planet carrier, the planet gear being arranged on the planet pin. At least one sliding bearing is arranged between the planet pin and the planet carrier, and the planet gear is rotationally fixed to the planet pin.

6 Claims, 3 Drawing Sheets

(51) Int. Cl.
*F03D 11/02* (2006.01)
*F16H 57/08* (2006.01)

(56) References Cited

U.S. PATENT DOCUMENTS

| | | | | |
|---|---|---|---|---|
| 5,409,430 | A * | 4/1995 | Hashimoto | F16H 1/2863 475/331 |
| 6,024,666 | A * | 2/2000 | Bunnow | F16H 48/08 475/230 |
| 6,420,808 | B1 | 7/2002 | Hoesle | |
| 6,544,140 | B2 * | 4/2003 | Gradu | F16C 19/547 384/585 |
| 7,935,020 | B2 | 5/2011 | Jansen et al. | |
| 8,246,503 | B2 * | 8/2012 | Sheridan | F02C 7/06 184/6.12 |
| 2004/0162181 | A1 | 8/2004 | LaBath | |
| 2006/0205557 | A1 | 9/2006 | Arndt et al. | |
| 2009/0221397 | A1 | 9/2009 | Demtroeder | |
| 2013/0053210 | A1 | 2/2013 | Kari et al. | |
| 2013/0217535 | A1 * | 8/2013 | Suzuki | F03D 11/02 475/331 |

FOREIGN PATENT DOCUMENTS

| | | | |
|---|---|---|---|
| DE | 199 17 605 A1 | 1/2001 | |
| DE | 102 54 527 A1 | 6/2004 | |
| DE | 102 60 132 A1 | 7/2004 | |
| DE | 10 2005 048 527 A1 | 4/2007 | |
| DE | 102011087578 A1 * | 6/2013 | F16H 48/10 |
| DE | 102012202450 A1 * | 8/2013 | F16H 57/082 |
| EP | 1 544 504 A2 | 6/2005 | |
| EP | 2 031 273 A2 | 3/2009 | |
| GB | 585 930 A | 2/1947 | |
| JP | 2005-325966 A | 11/2005 | |
| WO | 2004/048805 A1 | 6/2004 | |
| WO | 2007/135156 A1 | 11/2007 | |
| WO | WO 2008092448 A1 * | 8/2008 | F03D 1/003 |

* cited by examiner

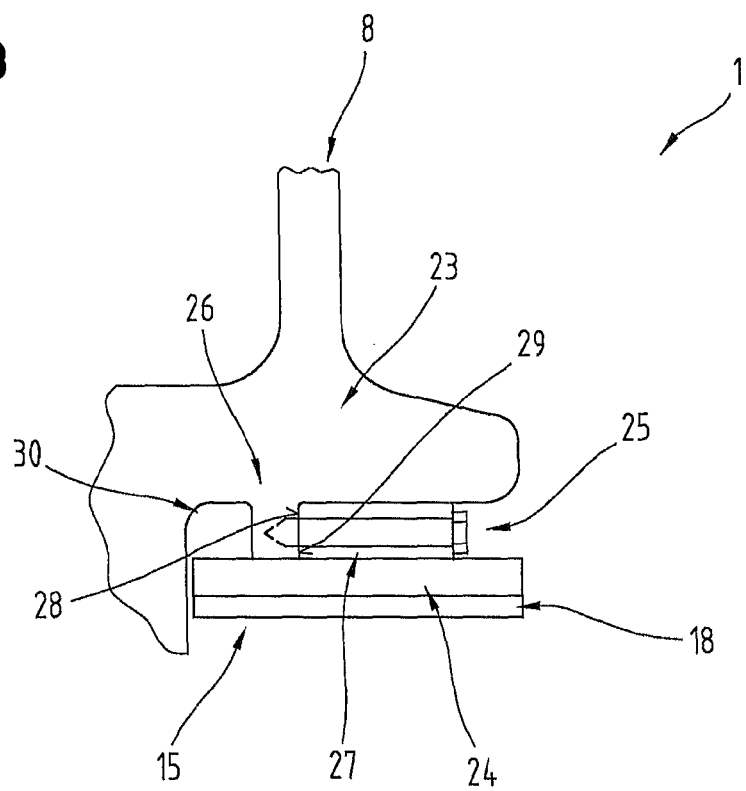
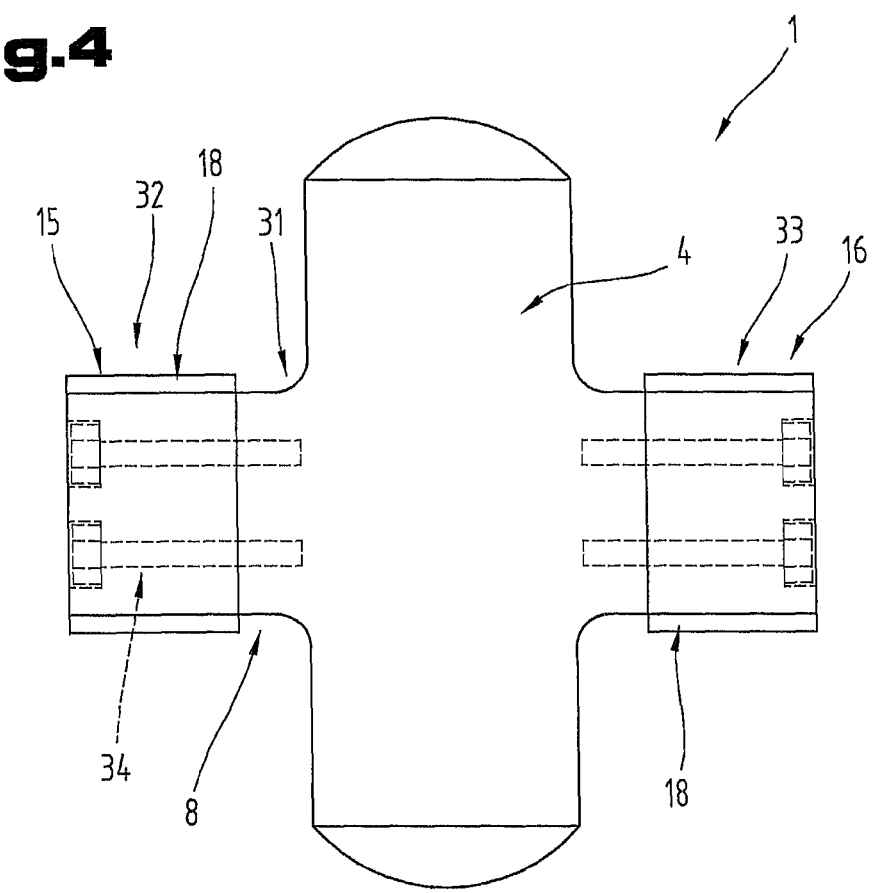

WIND TURBINE

CROSS REFERENCE TO RELATED APPLICATIONS

This application is the National Stage of PCT/AT2013/050011 filed on Jan. 15, 2013, which claims priority under 35 U.S.C. §119 of Austrian Application No. A 38/2012 filed on Jan. 16, 2012, the disclosure of which is incorporated by reference. The international application under PCT article 21 (2) was not published in English.

The invention relates to a wind turbine with a rotor and a generator, wherein a planetary transmission is arranged between the rotor and the generator which planetary transmission is operatively connected to the rotor and the generator, wherein the planetary transmission comprises at least one planet gear, at least one planet pin and a planet carrier, and wherein the planet gear is arranged on the planet pin.

Planetary transmissions for wind turbines for generating electricity, as known for example from DE 102 60 132 A1, are used to translate the relatively low speed of the rotor of the wind turbine into a higher speed of the generator rotor. Usually in such planetary transmissions, as also described in DE 102 60 132 A1, roller bearings are used as bearing elements for the planet gears. However, the prior art also describes sliding bearings as bearing elements, for example in EP 1 544 504 A2 or AT 509 624 A1.

The high elastic deformation of the planet carriers of a wind turbine, particularly in the multi-megawatt power range, leads in combination with a rotating application point to the so-called outer ring creeping of roller bearings. This relative movement cannot be avoided even with a very high covering of the outer ring with the inner diameter of the planet gear and is often addressed by omitting the outer ring and designing the planet bore as a roller body running surface.

In the embodiment with sliding bearings such a solution is not possible in practical terms, and is at least not feasible. This solution to the problem would mean directly coating the planet bore. This does not work in practice because of the heat treatment required for hardening the planetary gears, which rules out all known metal and synthetic bearing materials. Furthermore, because of the large wall thickness of the planet gears a sprue of the planet bore in the rotation method with metal materials is very problematic. Last but not least direct, coating also represents a logistical problem as the planet gears of a wind turbine transmission usually weigh a several hundred kilograms for each planet gear.

AT 509 624 A1 describes the possibility that the multilayered sliding bearing can be displaced radially so that edge carriers can also be formed. This is offset or resisted by having a hard sliding layer and possibly a run-in layer.

The objective of the present invention is to improve the sliding bearing in a planetary transmission of a wind turbine provided with sliding bearings.

Said objective is achieved in the aforementioned wind turbine in that at least one sliding bearing is arranged between the planet pin and the planet carrier and in that the planet gear is connected non-rotatably to the planet pin.

By arranging the sliding bearing between the planet pin and the planet carrier a bearing of the planet gear on the planet pin is not necessary. In this way the sliding bearing is outside the field of influence of the circumferentially deformable planet gear, whereby the "walking effect" of the planet gear on the sliding bearing is avoided. This ensures even with high loads on the sliding bearing the secure positioning of the sliding bearing in the planet carrier. The rotation and/or axial displacement of the sliding bearing can be avoided in this way. In addition, by means of this arrangement of the sliding bearing enormous edge loads caused by tilting moments in the overload range because of the larger bearing distance can be reduced considerably if two sliding bearings are used spaced apart from one another in axial direction.

Since the planet carrier is designed to consist of a plurality of parts and has an outer part and an inner part which is arranged adjacent to the planet pin and the at least one sliding bearing is formed by the inner part of the planet carrier, with a separation of the planet carrier into a plurality of components, it is possible to dispense with additional sliding bearings, as the planet carrier itself can take over the function of the sliding bearing. In this way a reduction in weight is also achieved. It is also an advantage that the inner part of the planet carrier can be replaced or recoated if necessary. It is thus also possible in the case of a hydrodynamic sliding bearing to make the coating relatively thin which also reduces the weight. As a result of all the weight reductions it is possible to achieve lower mechanical loading of the bearing of the planet gears, whereby the sliding bearings can have a longer lifetime despite the hydrodynamic operation.

According to one embodiment variant the planet pin is designed in one piece with the planet gear. It is thus possible to expose the planetary transmission to higher loads, as by avoiding a separate connection between the planet gear and the planet pin a potential breaking point is eliminated.

However, it is also possible for the planet pin to consist of a plurality of parts and comprise a central part and a first and a second side part, the central part being formed by the planet gear. Said embodiment variant has the advantage compared to the aforementioned one-piece embodiment variant, that the production of the planet gear is simpler and that the two side parts are lighter so that they can be manipulated more easily, for example for the application of a coating.

To avoid or reduce the axial mobility of the planet gear it is possible to provide a stop disc between the at least one sliding bearing and the planet gear. In this way it is possible that the planet gear bears laterally on the sliding bearing so that when using two sliding bearings arranged spaced apart from one another axially the planet gear can be positioned between the sliding bearings and in this way has less mobility in axial direction.

According to one embodiment variant the at least one inner part is connected to the outer part. Thus relative movements of the sliding bearing are avoided in relation to the outer part of the planet carrier, whereby peak loads caused by tilting moments can be avoided as well as the possible destruction of the sliding bearings.

It is also possible that the connection of the at least one inner part to the outer part is formed by a connecting element which has its greatest dimension in axial direction. Thus there can also be a further reduction of local peak loads of the sliding bearing, as in this way forces caused by tilting moments acting on the bearing can only be transferred in axial direction via the connecting element.

According to another embodiment variant the inner part is connected in a form-fitting manner to the outer part in addition to or alternatively to the aforementioned connecting method. In this way a better transfer of forces can be achieved. Furthermore, the form-fitting element can also be used as an installation aid of the inner part to the outer part, in that the correct positioning is determined by the form-fitting element. This is an advantage in particular with respect to divided bearing shells, i.e. for example sliding bearing half shells or sliding bearing segments, if the latter in the two half shells or the segments are made of different materials, as known in sliding bearing technology. In this case other materials are used, in particular harder ones, for the more heavily loaded lower half, than in the upper less loaded bearing half.

In the preferred embodiment variant the sliding bearing is in the form of a bush, as in this way the integration of the sliding bearing into the planet carrier can be configured to be simpler, in that fewer connecting points are necessary compared to half shells or segments.

For a better understanding of the invention the latter is explained in more detail with reference to the following Figures.

In much simplified schematic representation:

FIG. 3 shows a section of a planet gear of one embodiment variant in cross section;

FIG. 4 shows a section of a planet gear of a further embodiment variant in cross section.

Figure 1:
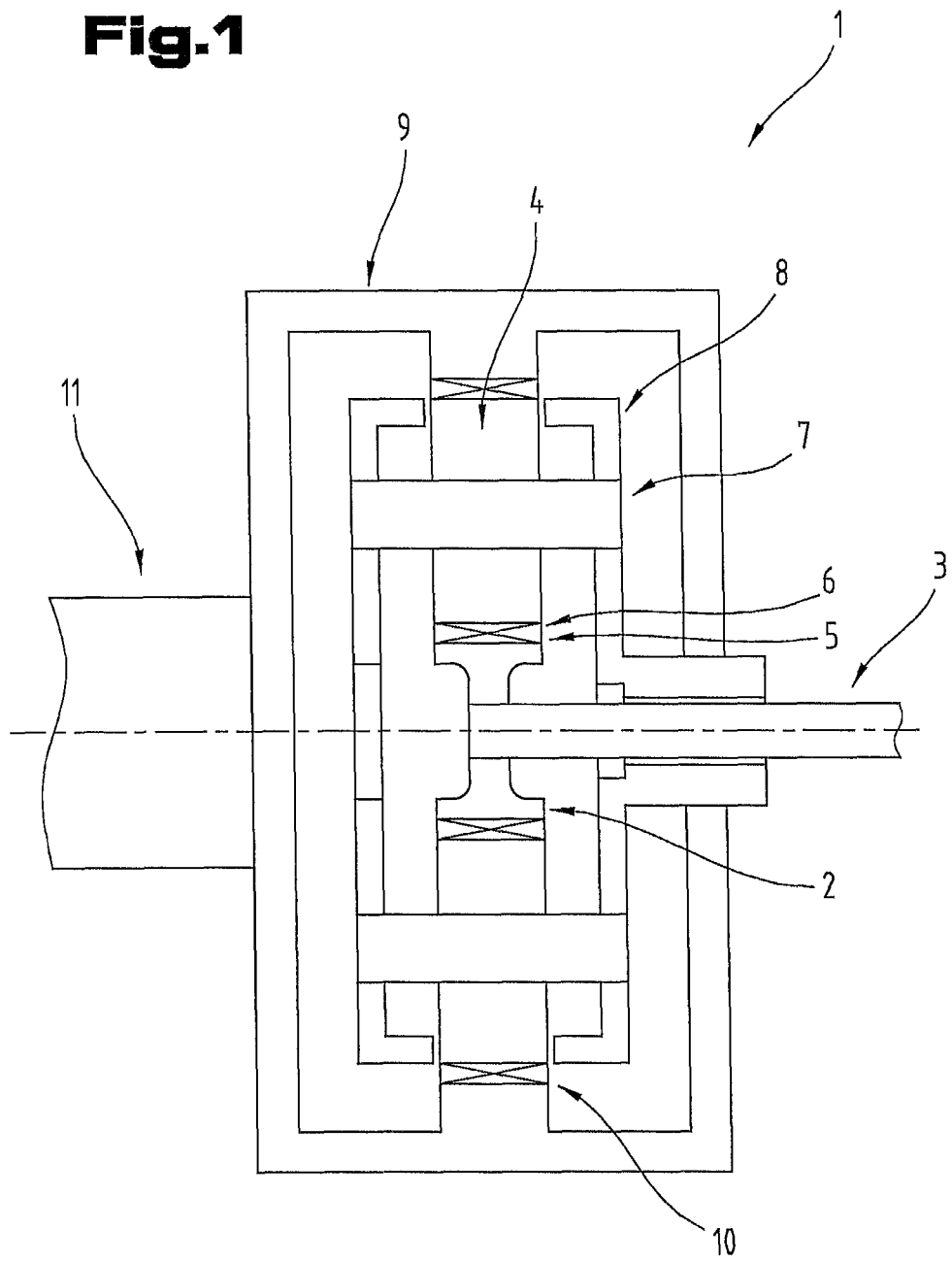
FIG. 1 shows a transmission in the form of a planetary transmission in cross-sectional side view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows a transmission in the form of a simple planetary transmission 1 for a wind turbine in cross-sectional side view.

As generally known wind turbines comprise a tower with a gondola arranged at its upper end, in which the rotor with rotor blades is mounted. Said rotor is operatively connected via the planetary transmission 1 to a generator, which is also located in the gondola, whereby the low speed of the rotor is translated into a higher speed of the generator by means of the planetary transmission 1. As such embodiments of wind turbines formed part of the prior art, reference is made at this point to the relevant literature on this.

The planetary transmission 1 comprises a sun gear 2, which is connected in a non-rotatable manner to a shaft 3, which leads to the generator rotor. The sun gear 2 is surrounded by a plurality of planet gears 4, for example two, preferably three or four. Both the sun gear 2 and the planet gears 4 comprise spur toothings 5, 6 which are in meshing engagement with one another, wherein said spur toothings 5, 6 are indicated by a cross in FIG. 1. The planet gears 4 are mounted on an axis formed by a planet pin 7, the so-called planet axis. Said planet pins 7 are used as separate components in bores of a planet carrier 8. A ring gear 9 is arranged over the planet gears 4 which also comprises at least one toothing 10 on an inner surface, which is in meshing engagement with the spur toothing 6 of the planet gears 4. The ring gear 9 is connected non-rotatably to a rotor shaft 11 of the rotor of the wind turbine. The spur toothings 5, 6 or the toothing 10 can be configured as a straight toothing or helical toothing.

As such planetary transmissions 1 are already known in principle from the prior art, for example from the aforementioned documents from the prior art, a further discussion of the latter is not necessary at this point. However, it should be noted that not only single-stage embodiments of planetary transmissions 1 are possible within the scope of the invention, but also multi-stage ones, for example two or three-stage ones, which is why additional spur gear stages can also be integrated into at least one planet gear 4.

It should be noted that the singular number is used in the following with respect to the planet gear 4. Of course, the invention can also be applied to all of the planet gears 4 of such a planetary transmission 1 and in the preferred embodiment all of the planet gears can be configured according to the invention.

Figure 2:
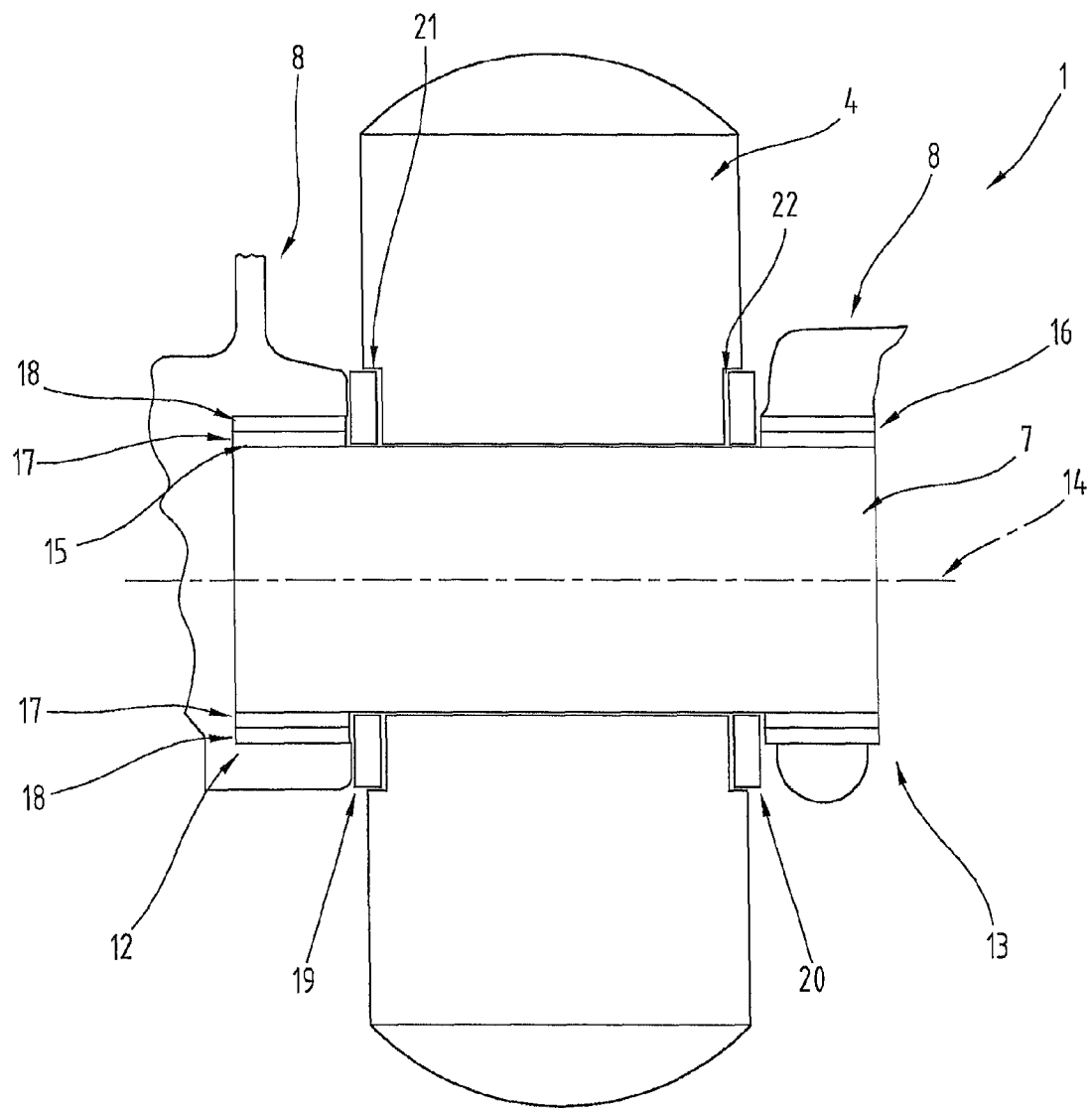
FIG. 2 shows a section of a planet gear in cross section.

FIG. 2 shows a section of the planetary transmission 1. It shows the planet gear 4, the planet pin 7 and the part of the planet carrier 8 relevant to the invention.

The planet pin 7 is connected in a non-rotatable manner to the planet gear 4, for example by means of a press-fit or by welding etc. and is mounted on both sides in the planet carrier 8. In addition, in a first end section 12 and in a second end section 13 of the planet pin 7, which is opposite the first end section 12 along a longitudinal middle axis 14 of the planet pin 7 in axial direction, at least one sliding bearing 15, 16 is arranged between the planet pin 7 and the planet carrier 8.

Preferably, the sliding bearings 15, 16 are configured as multi-layered sliding bearings. The multi-layered sliding bearings can be configured in principle in the form of sliding bearing half shells or sliding bearing segments. The sliding bearing half shells thereby cover an angular area of at least approximately 180°, the sliding bearing segments however cover a different angular area, for example 120° or 90°, so that more than two sliding bearing segments are arranged. Preferably, the multi-layered sliding bearings are in the form of bearing bushes, i.e. planet bearing bushes, which are connected in a non-rotatable manner to the planet pin 7, for example by means of a press-fit or other suitable method. However, the sliding bearing half shells or the sliding bearing segments can be mounted in corresponding bearing mounts which are formed on the planet pin 7, as is known for sliding bearings.

A multi-layered sliding bearing consists of at least one support layer 17 and at least one sliding layer 18, which is applied onto the support layer 17 (in FIG. 2 only shown on the left sliding bearing 15). The sliding layer 18 thereby forms a running surface for the planet carrier 8.

In addition to this two-layered embodiment of the multi-layered sliding bearing it is also possible to have intermediate layers between the sliding layer 18 and the support layer 17, for example a bearing metal layer and/or at least one bonding layer and/or a diffusion barrier layer.

Examples of bearing metal layers are:

Bearing metals based on aluminium, in particular: AlSn6CuNi, AlSn20Cu, AlSi4Cd, AlCd3CuNi, AlSi11Cu, AlSn6Cu, AlSn40, AlSn25CuMn, AlSi11CuMgNi;

Bearing metals based on copper, in particular: CuSn10, CuAl10Fe5Ni5, CuZn31Si1, CuPb24Sn2, CuSn8Bi10;

Bearing metals based on tin, in particular: SnSb8Cu4, SnSb12Cu6Pb.

Other bearing metals can be used than those mentioned above that are based on nickel, silver, iron or chrome alloys.

A bonding layer or a diffusion barrier layer can be formed for example by an aluminium layer, tin layer, copper layer, nickel layer, silver layer or alloys thereof, in particular binary alloys.

The support layer 17 itself is preferably made from a hard and homogenous bearing base material, preferably selected from a group comprising Cu-Zn-alloys, for example CuZn31Si, CuSnZn, by an AlZn or CuAl alloy, steel, wherein said alloys can contain additional elements such as Si, Mg, Mn, Ni, Zr, Ti, Fe, Cr, Mo in a total amount of a maximum of 10 wt. %.

The sliding layer 18 is preferably made from a material selected from a group comprising alloys based on Al, AlZn, AlSi, AlSnSi, CuAl, CuSn, CuZn, CuSnZn, CuZnSn, CuBi, Bi, Ag, AlBi, sliding coatings.

Examples of preferred alloys for the sliding layer 18 are AlSn20Cu, AlZn4Si3, AZnSi4.5.

As sliding coatings resins or resin formulations known from the prior art for this application can be used.

A sliding coating is preferred which in the dry state comprises 40 wt. % to 45 wt. % $MoS_2$, 20 wt. % to 25 wt. % graphite and 30 wt. % to 40 wt. % polyamide-imide, wherein if necessary hard particles, such as e.g. oxides, nitrides or carbides, can be used in the sliding coating in a proportion of a maximum of 20 wt. % which replace a proportion of the solid lubricants.

It is also possible that a polymer-based running-in layer is provided on the sliding layer 18, such as for example one of the said sliding coatings. It is also possible for a hard layer to be applied additionally on the sliding layer 18, for example a so-called DLC layer, for example SiC or C.

In a preferred embodiment of the invention a lead-free Cu-alloy, in particular CuZn31 Si, is used as the support layer 17 and AlSn20Cu is used as the sliding layer 18.

Furthermore, in the preferred embodiment the sliding layer 18 is deposited by means of a PVD method onto the support layer 17 or an intermediate layer, in particular by means of a sputtering method.

In the preferred embodiment a stop disc 19, 20 is arranged between the planet gear 4 and the left sliding bearing 15 and between the planet gear 4 and right sliding bearing 16 respectively. Said stop discs 19, 20 can thereby be arranged partly in a respective recess 21, 22 in the planet gear 4 formed on the planet gear 4 in the connection area on the planet pins 7 by a smaller axial width of the planet gear 4. The stop discs 19, 20 each bear directly on one of the sliding bearings 15 or 16 and on the planet gear 4.

Although two sliding bearings 15, 16 are shown in FIG. 2 it is also possible within the scope of the invention to arrange more than two such sliding bearings 15, 16 per planet gear 4 in the planetary transmission 1, for example in that on at least one side of the planet gear 4 two sliding bearings 15 or 16 lying next to one another in axial direction are arranged. In other words at least two sliding bearings 15, 16 can be arranged per planet gear 4.

FIG. 3 shows a detail of an embodiment variant of the planetary transmission 1 in the region of the left sliding bearing 15, wherein said embodiment variant can also be applied to the right sliding bearing 16 (FIG. 2).

The planet carrier 8 consists of or comprises an outer part 23 and at least one inner part 24.

The outer part 23 of the planet carrier 8 is thus the component which is arranged in radial direction of the planet carrier 8 outside, i.e. at least partly above, the at least one inner part 24. Thus the inner part 24 of the planet carrier 8 is defined as the component which is arranged in radial direction at least partly inside, i.e. underneath, the outer part 23. The planet carrier 8 bears via the at least one inner part 24 on the planet pin 7. The outer part 23 has no contact with the planet pin 7 however.

The inner part 24 is designed to be separate from the outer part 23, i.e. is configured not to be in one piece with the latter.

The inner part 24 forms the sliding bearing 15 according to FIG. 2. In this case the support layer 17 is formed by the inner part 23 itself, so that the inner part 24 only needs to comprise at least the sliding layer 18. However, also the other aforementioned layers can be arranged in addition to the sliding layer 18 to form the multi-layered sliding bearing, in particular the bearing metal layer.

The inner part 24 is preferably connected to the outer part 23. In particular, at least one connecting element 25 is used in addition which has its greatest dimension in axial direction of the planet pin 7. The at least one connecting element 20 can be a rivet for example. In the preferred embodiment variant the connecting element 20 is formed by a threaded screw.

The screw can be a simple threaded screw. However, it is also possible to use threaded screws with a self-locking thread or a screw with a multi-start thread.

To improve the connection of the inner part 24 to the outer part 23 the outer part 23 can have a web 26 pointing in radial direction inwardly to the planet pin 8, on which web the at least one inner part 24 bears. Preferably, said web 26 is configured so that it is partly placed in radial direction above the inner part 24. In addition, according to a further embodiment variant the inner part 24 comprises a web 27 pointing outwardly in radial direction with which the at least one inner part 24 bears on the outer part 23, in particular on the web 26 of the outer part 23. A bearing surface 28 of the inner part 24 and a bearing surface 29 of the outer part 24 bearing thereon are oriented at least approximately vertically or vertically, as shown in FIG. 3.

To improve the connection it is possible that the bearing surface 28 of the inner part 24 and/or the bearing surface 29 of the outer part 23 is or are roughened at least in some parts and/or is or are provided with a friction-increasing coating at least in some sections. For example an adhesive or resin layer, e.g. made from a phenolic or acrylate resin, can be used as the friction-increasing coating, into which hard particles, such as for example oxides, nitrides or carbides of transition metals or corundum etc., are embedded, wherein said hard particles preferably project out from the coating surface, so that they implant themselves in the respective other bearing surface 28 or 29 when connecting the inner part 24 to the outer part 23.

The two components of the planet carrier 8 can also be connected alternatively or additionally by a form-fitting element, which is arranged on the inner part 24, in particular on the web 27 of the inner part 24 and which preferably projects over the bearing surface 28 of the inner part 24. The outer part 23, in particular the web 26 of the outer part 23, has a corresponding depression for this into which the form-fitting element projects. The cross section of the depression is thereby adapted to the cross section of the form-fitting element with respect to its size, i.e. in that the two cross sections are almost of equal size, wherein the cross section of the depression is slightly larger than the cross section of the form-fitting element (as viewed in the same direction respectively).

In principle, the form-fitting element can have any shape, whereby shapes with at least one undercut are also possible. For example the form-fitting element can be configured to be pimple-like or web-like. It is also possible that the form-fitting element is configured to extend with its longitudinal extension in the direction of the circumference of the inner part 24. Furthermore, a cross-sectional area can be configured to be tapering or widening when viewed in plan view.

Of course, not only one form-fitting element 25 can be provided but a plurality of discrete form-fitting elements can be distributed over the bearing surface 28 of the inner part 24 and/or the bearing surface 29 of the outer part 23.

It is also possible that the inner part 24 is formed by breaking separation from the outer part 23, whereby in this case the breaking point can also act as a form-fitting element.

It should be noted that the webs 26, 27 shown in FIG. 3 are only described by way of example. For example, it is not absolutely necessary that the web 26 of the outer part 23 is formed as shown in FIG. 3 in axial direction by forming a groove-like recess on the outer part. Rather the latter can also be designed as a shoulder without said recess 30 on the outer part.

FIG. 4 shows a detail of a further and possibly independent embodiment of the planetary transmission 1, in which the same reference numbers and component names have been used for the same parts as in the preceding FIGS. 1 to 3. To avoid unnecessary repetition reference is made to the detailed description of the preceding FIGS. 1 to 3.

FIG. 4 shows the planet gear 4 and the planet pin 7. However, the planet carrier 8 is not shown. Reference is made for example to FIG. 2.

In this embodiment variant of the planetary transmission 1 the planet pin 8 is formed in one piece with the planet gear 4. In the shown embodiment variant the planet pin 8 is designed in multiple parts and comprises a central part 31 and a first and second side part 32, 33 and the central part 31 is formed by the planet gear 4.

The two side parts 32, 33 form in this embodiment variant the multi-layered sliding bearings, i.e. the sliding bearings 15 and 16, wherein the support layer is not formed by a separate layer but by the respective component itself, i.e. the left side part 32 or the right side part 33. The multiple layers of the sliding bearings 15, 16 can be formed as described above. At least the two side parts 32, 33 have the sliding layer 18.

In the two embodiment variants of the planetary transmission 1 the lubricant coating is provided by the direct deposition of at least the sliding layer 18 onto the respective component. The deposition can be performed for example from the gas phase, in particular by sputtering, but also galvanically, etc.

The two side parts 32, 33 are connected to the central part 31, in particular detachably, for example by means of screws 34, or by another suitable method.

In one embodiment variant it is possible for the planet pin 7 to be configured in one piece and is in addition configured in one piece with the planet gear 4, so that the latter form only a single component of the planetary transmission 4.

In all embodiment variants in the sliding layer 18 or the sliding coating or in at least one layer of the sliding coating channel-like recesses can be provided for guiding a lubricant.

In the preferred embodiment of the planet gear the sliding bearings 15, 16 (also with the direct coating of a component of the planetary transmission 1) can also be operated purely hydrodynamically without hydrostatic support. In this way no oil pumps or the like are necessary for the supply of lubricant oil and for maintaining hydrostatic pressure. The oil is supplied in this purely hydrodynamic solution onto the unloaded bearing side and drawn into the bearing by the rotational movement of the planet gear 4.

The exemplary embodiments show possible embodiment variants of the planetary transmission 1, whereby it should be noted at this point that various different combinations of the individual embodiment variants are also possible and this variability, due to the teaching on technical procedure, lies within the ability of a person skilled in the art in this technical field.

Finally, as a point of formality, it should be noted that for a better understanding of the structure of the planetary transmission 1 the latter and its components have not been represented true to scale in part and/or have been enlarged and/or reduced in size.

| List of Reference Numbers | |
| --- | --- |
| 1 | planetary transmission |
| 2 | sun gear |
| 3 | shaft |
| 4 | planet gear |
| 5 | spur toothing |
| 6 | spur toothing |
| 7 | planet pin |
| 8 | planet carrier |
| 9 | ring gear |
| 10 | toothing |
| 11 | rotor shaft |
| 12 | end section |
| 13 | end section |
| 14 | longitudinal middle axis |
| 15 | sliding bearing |
| 16 | sliding bearing |
| 17 | support layer |
| 18 | sliding layer |
| 19 | stop disc |
| 20 | stop disc |
| 21 | recess |
| 22 | recess |
| 23 | outer part |
| 24 | inner part |
| 25 | connecting element |
| 26 | web |
| 27 | web |
| 28 | bearing surface |
| 29 | bearing surface |
| 30 | recess |
| 31 | central part |
| 32 | side part |
| 33 | side part |
| 34 | screw |

The invention claimed is:

1. A wind turbine comprising:
a rotor;
a generator; and
a planetary transmission arranged between the rotor and the generator and operatively connected to the rotor and the generator;
the planetary transmission comprising:
a planet pin;
a planet gear arranged on the planet pin and connected non-rotatably to the planet pin;
a planet carrier; and
at least one sliding bearing arranged between the planet pin and the planet carrier;
wherein the planet carrier is configured as multiple parts and comprises:
an inner part arranged adjacent to the planet pin, the inner part comprising an inner part web pointing outwardly in a radial direction and an inner part bearing surface oriented vertically or approximately vertically, wherein the at least one sliding bearing is formed by the inner part;
an outer part comprising an outer part web pointing in a radial direction inwardly to the planet pin and configured to be partly placed in the radial direction above the inner part, wherein the inner part bears on the outer part web via the inner part web, and an outer part bearing surface oriented vertically or approximately vertically, the outer part bearing surface bearing on the inner part bearing surface; and
a connecting element connecting the inner part of the outer part, wherein the connecting element has a greatest dimension in the axial direction of planet pin.

2. The wind turbine as claimed in claim 1, wherein the planet pin is configured in one piece with the planet gear.

3. The wind turbine as claimed in claim 1, wherein the planet pin is configured as multiple parts and comprises a central part and a first and a second side part, and wherein the central part is formed by the planet gear.

4. The wind turbine as claimed in claim 1, wherein between the at least one sliding bearing and the planet gear a stop disc is arranged.

5. The wind turbine as claimed in claim 1, wherein the inner part is connected to the outer part in a form-fitting manner.

6. The wind turbine as claimed in claim 1, wherein the at least one sliding bearing is configured as a sliding bearing bush.

\* \* \* \* \*